US009334355B2

(12) United States Patent
Taniguchi et al.

(10) Patent No.: US 9,334,355 B2
(45) Date of Patent: May 10, 2016

(54) CLEAR PAINT COMPOSITIONS COMPRISING HYPERBRANCHED, DENDRITIC, HYDROXYL-FUNCTIONAL POLYESTERS

(75) Inventors: Hitoshi Taniguchi, Yokohama (JP); Eishi Tsukamoto, Yokohama (JP); Hiroyuki Takagi, Yokohama (JP); Andreas Poppe, Shanghai (CN); Günter Klein, Münster (DE); Veronika Lackstadter, Hamm (DE); Bianca Giesen, Hamm (DE); Petra Wagner, Münster (DE); Björn Feldmann, Münster (DE); Sabine Holtschulte, Ascheberg (DE); Julia Melzer, Münster (DE); Tanja Bricke, Drensteinfurt (DE); Oliver Hilge, Drensteinfurt (DE); Benedikt Schnier, Warendorf (DE); Silke Hottenbacher, Münster (DE); Ulrike Clausen-Meiring, Senden (DE)

(73) Assignees: BASF Japan Ltd., Tokyo (JP); BASF Coatings GmbH, Munster (DE)

( * ) Notice: Subject to any disclaimer, the term of this patent is extended or adjusted under 35 U.S.C. 154(b) by 769 days.

(21) Appl. No.: 12/663,356

(22) PCT Filed: Jun. 5, 2008

(86) PCT No.: PCT/EP2008/004495
§ 371 (c)(1),
(2), (4) Date: Dec. 8, 2010

(87) PCT Pub. No.: WO2008/148555
PCT Pub. Date: Dec. 11, 2008

(65) Prior Publication Data
US 2011/0263789 A1    Oct. 27, 2011

(30) Foreign Application Priority Data
Jun. 6, 2007   (DE) .......................... 10 2007 026 722

(51) Int. Cl.
| | | |
|---|---|---|
| *C08G 63/00* | (2006.01) | |
| *C08L 67/00* | (2006.01) | |
| *C08L 73/00* | (2006.01) | |
| *C08L 77/00* | (2006.01) | |
| *C08F 283/00* | (2006.01) | |
| *C08G 63/91* | (2006.01) | |
| *C08G 67/00* | (2006.01) | |
| *C08G 69/00* | (2006.01) | |
| *C08G 63/02* | (2006.01) | |
| *C08G 63/16* | (2006.01) | |
| *C08G 18/42* | (2006.01) | |
| *C09D 167/00* | (2006.01) | |
| *C08L 61/28* | (2006.01) | |

(52) U.S. Cl.
CPC .............. *C08G 18/42* (2013.01); *C08G 63/912* (2013.01); *C09D 167/00* (2013.01); *C08L 61/28* (2013.01)

(58) Field of Classification Search
USPC ......................................... 524/599; 525/418
See application file for complete search history.

(56) References Cited

U.S. PATENT DOCUMENTS

| | | | | |
|---|---|---|---|---|
| 5,418,301 A | * | 5/1995 | Hult et al. ...................... | 525/437 |
| 6,211,329 B1 | * | 4/2001 | Rehnberg et al. ............. | 528/220 |
| 6,569,956 B1 | * | 5/2003 | Ramesh ......................... | 525/437 |
| 6,861,495 B2 | * | 3/2005 | Barsotti et al. ................ | 528/272 |
| 7,005,051 B2 | * | 2/2006 | Kojima et al. ................. | 204/488 |
| 7,858,732 B2 | | 12/2010 | Bruchmann et al. | |
| 7,858,733 B2 | | 12/2010 | Bruchmann et al. | |
| 2002/0119320 A1 | | 8/2002 | Ramesh et al. | |
| 2002/0136901 A1 | | 9/2002 | Ramesh et al. | |
| 2010/0197867 A1 | | 8/2010 | Niimi et al. | |

FOREIGN PATENT DOCUMENTS

| | | |
|---|---|---|
| CN | 1961023 A | 5/2007 |
| DE | 102004026904 A1 | 12/2005 |
| EP | 0991690 B1 | 8/2004 |
| WO | WO93/17060 A1 | 9/1993 |
| WO | WO97/22420 A1 | 6/1997 |
| WO | WO00/37542 A1 | 6/2000 |
| WO | WO03/093343 A1 | 11/2003 |
| WO | WO2004/020503 A1 | 3/2004 |

OTHER PUBLICATIONS

Johansson et al., Design of coating resin by changing the macromolecular architecture: solid and liquid coating systems, Progress in Organic Coatings, 48 (2003) 194-200.*
Pettersson, Hyperbranched Polymers—Unique Design Tools for Multi Property Control in Resins and Coatings, Perstop Polyols—Application Technology, 1996, 1-19.*
WPI English Language Abstract AN-2002-109139[15] for Japanese Patent JP2001214119A published Aug. 7, 2001, 2 pages.
WPI English Language Abstract AN-2004-051146 [05] for U.S. Patent Application No. US20030171473A1 published Sep. 9, 2011, 2 pages.
International Search Report for International Application No. PCT/EP2008/004494 dated Sep. 16, 2008.
International Preliminary Report on Patentability for International Application No. PCT/EP2008/004494 dated Jan. 12, 2010.
Written Opinion for International Application No. PCT/EP2008/004494 dated Sep. 16, 2008.
International Search Report for PCT/EP2008/004495 dated Sep. 16, 2008.
Written Opinion of PCT/EP2008/004495 with an international filed of Jun. 5, 2008.
International Preliminary Report on Patentability for international application No. PCT/EP2008/004495 dated Feb. 9, 2010.
Hansen, C.M., "The Universatility of the Solubility Parameter," Industrial and Englineering Chemistry Product Research and Development, Mar. 1969, vol. 8, No. 1, p. 2-11.

* cited by examiner

*Primary Examiner* — Susannah Chung
*Assistant Examiner* — Robert T Butcher

(57) ABSTRACT

Disclosed is a hyperbranched, dendritic, hydroxyl-functional polyester comprising an OH number greater than or equal to 180 mg KOH/g as measured via DIN 53240 and to clearcoat compositions comprising said polyesters. Also disclosed are processes for preparing the disclosed polyester, methods of making coated automotive substrates by applying the disclosed clearcoat compositions to automotive substrates, and to coated substrates made therefrom.

13 Claims, No Drawings

CLEAR PAINT COMPOSITIONS COMPRISING HYPERBRANCHED, DENDRITIC, HYDROXYL-FUNCTIONAL POLYESTERS

CROSS REFERENCE TO RELATED APPLICATIONS

This application is a National Phase Application of Patent Application PCT/EP2008/004495 filed on 5 Jun. 2008, which claims priority to DE102007026722.5, filed 6 Jun. 2007, both of which are hereby incorporated by reference in their entirety.

FIELD OF THE INVENTION

The present invention relates to clearcoat compositions which comprise at least one hyperbranched, dendritic, hydroxyl functional polyester, and also to hyperbranched, dendritic, hydroxyl functional polyesters. The invention further relates to processes for preparing hyperbranched, dendritic, hydroxyl functional polyesters, to their use for producing clearcoating compositions for automotive finishing, and to substrates coated with them.

BACKGROUND OF THE INVENTION

Clearcoat materials for automotive finishing preferably possess good optical properties (appearance). In addition, however, it is also desirable that, for the purpose of improved environmental compatibility, the clearcoat materials have a low solvent content, i.e., a high solids fraction. Increasing the solids fraction of a clearcoat material usually entails, however, a deterioration in the optical properties, owing to the increase in the viscosity of the clearcoat material.

Generally speaking, one of the factors on which the viscosity of a polymer solution depends is the dimension of the polymer, i.e., the hydrodynamic radius of the dissolved molecule. The hydrodynamic radius of the polymer is influenced in particular by the solvation of the polymer chains by the solvent, which differs sharply according to the particular solvent. Therefore, in order to achieve a low viscosity in spite of a high solids fraction in a polymer solution, it is in principle possible to use solvents which bring about only a low level of solvation of the polymer chains (theta solvents). Disadvantageous consequences of doing so, however, include the non-universal usefulness of these solvents with all polymers, and also the high costs of these solvents, depending on the resins employed.

Another way of achieving a low solution viscosity and hence effective leveling at the same time as a high solids fraction is to use very compact macromolecules, such as, for example, to use star polymers and hyperbranched, dendritic compounds. It is known that compact macromolecules of this kind, in solution or in a composition, have a low viscosity in tandem with a comparatively high solids fraction (e.g., Roovers, J., Macromolecules 1994, 27, 5359-5364 and Roovers, J. et al., Macromolecules 1993, 26, 4324-4331). Using star polymers is suitable only for short polymer chain arms, since at high concentrations star polymers with long polymer chain arms are subject to repulsive interactions, which can lead to quasicrystalline ordering phenomena in solution. These ordering phenomena lead to an increase in the viscosity, which is a disadvantage for the reasons mentioned above. Hyperbranched, dendritic compounds which are not subject to such ordering phenomena are therefore generally preferred.

Hyperbranched, dendritic compounds, i.e., hyperbranched, dendritic macromolecules and dendrimers, can be described in general terms as three-dimensional, highly branched molecules having a treelike structure. Dendrimers are highly symmetrical, whereas similar macromolecules, referred to as hyperbranched and/or dendritic, may to a certain extent be asymmetrical and nevertheless retain the highly branched treelike structure. In general it is possible to prepare dendrimers having a narrow molar mass distribution; in other words, in that case they are monodisperse or substantially monodisperse hyperbranched macromolecules. For monodisperse compounds the ratio of the weight-average to the number-average molecular weight $(M_w/M_n)=1$, whereas for substantially monodisperse compounds $M_w/M_n \sim 1$. Hyperbranched and dendritic macromolecules can typically be prepared starting from an initiator or nucleus having one or more reactive sites and a number of branching layers ("generations") and, if desired, a layer of chain-terminating molecules (divergent synthesis approach). The continued replication of branching layers normally produces an increased multiplicity of branching and, if appropriate or desired, an increased number of end groups. The layers are typically called generations and the branches dendrons.

Binders based on hyperbranched polyesters are prior art. For example, U.S. Pat. No. 6,569,956 B1 describes a hyperbranched polyester-polyol macromolecule having a multiplicity of external and internal hydroxyl groups located on it, it being possible to use these groups to produce coating compositions having a high solids fraction. The hyperbranched macromolecules described therein, however, have only a low level of hydroxyl functionalization, which is a disadvantage for the production of hard and chemical-resistant coating compositions.

WO 03/093343 A1 as well describes high-functionality, hyperbranched, hydroxyl functional polyesters which can be used in coatings and paints. The high-functionality hyperbranched polyesters it describes, however, are molecularly and structurally heterogeneous, meaning that, although they can be prepared with little effort, they can be used only conditionally to achieve a high solids fraction while at the same time imparting good optical properties to coating compositions. Moreover, the polyesters described therein lack general compatibility with nonpolar aprotic solvents.

WO 2004/020503 A1 describes a process for preparing hyperbranched, water-soluble or water-dispersible polyesters from dicarboxylic acids and polyetherpolyols which have at least 3 OH groups, these polyesters being suitable for use in paints and coatings. The polyesters it describes, however, are likewise molecularly heterogeneous polymers, which again can be used only with limitations for increasing the solids fraction while at the same time imparting good optical properties to coating compositions. Moreover, these polyesters too, lack general solvent compatibility.

EP 991 690 B1 describes a process for synthesizing polymeric polyalcohols composed substantially of polyester units, the process providing hyperbranched, dendritic polyesters having unprotected or protected hydroxyl end groups. The products of the process can be functionalized and/or terminated with various groups. No end use is stated for the polyesters preparable by the process described.

WO 93/17060 A1 discloses a hyperbranched, dendritic macromolecule composed substantially of polyester units. The composition of the macromolecule includes an initiator which has at least one hydroxyl group and to which at least one branching generation is added, this branching generation comprising at least one chain extender with at least one carboxyl group and at least two hydroxyl groups. If desired, the macromolecule is chain-terminated. The hyperbranched, dendritic macromolecules described are available inexpensively by way of the process which is likewise described. The macromolecules as described are suitable for uses including that as binders for systems with radiation curing. Their use in thermosetting clearcoat compositions, however, is not described. Furthermore, the hyperbranched, dendritic macromolecules set out in WO 93/17060 A1 are not suitable for use in clearcoat compositions featuring a high solids content and good optical properties.

DETAILED DESCRIPTION OF THE INVENTION

It is an object of the present invention, therefore, to provide a clearcoat composition with a highly functionalized binder that is suitable for producing coating compositions having a high solids fraction and good surface optical qualities.

SUMMARY OF THE INVENTION

This object is achieved by means of a clearcoat composition comprising at least one hyperbranched, dendritic, hydroxyl functional polyester having an OH number=180 mg KOH/gas measured via DIN 53240.

In a preferred embodiment, the polyester of the clearcoat composition according to the invention has a solubility parameter SP of =10.3. The solubility parameter SP is determined in accordance with the method described in the Journal of Applied Polymer Science, vol. 12, 1968, pp. 2359-2370. For that method, 0.5 g of polyester is diluted with 5 g of acetone. Then n-hexane or DI water (DIW=DeIonizedWater) is titrated in until a turbity is developed.

The solubility parameter SP can be calculated therefrom as follows:

$$SP = \frac{\sqrt{V_{ml}} \cdot \delta_{ml} + \sqrt{V_{mh}} \cdot \delta_{mh}}{\sqrt{V_{ml}} + \sqrt{V_{mh}}},$$

where $V_{ml}=(V_{acetone} \cdot V_{n\text{-}hexane})/(\phi_{acetone} \cdot V_{n\text{-}hexane}+\phi_{n\text{-}hexane} \cdot V_{acetone})$, $V_{mh}=(V_{acetone} \cdot V_{DIW})/(\phi_{acetone} \cdot V_{DIW}+\phi_{DIW} \cdot V_{acetone})$, $\delta_{ml}=\phi_{acetone} \cdot \delta_{acetone}+\phi_{n\text{-}hexane} \cdot \delta_{n\text{-}hexane}$, $\delta_{mh}=\phi_{acetone} \cdot \delta_{acetone}+\phi_{DIW} \cdot \delta_{DIW}$, where
$V_{acetone}$, $V_{n\text{-}hexane}$, $V_{DIW}$=molar volume of the respective solvent,
$\phi_{acetone}$, $\phi_{n\text{-}hexane}$, $\phi_{DIW}$=volume fraction of the respective solvent, and
$\delta_{acetone}$, $\delta_{n\text{-}hexane}$, $\delta_{DIW}$=solubility parameter SP of the respective solvent ($\delta_{acetone}$=9.75 (cal/cm$^3$)$^{1/2}$, $\delta_{n\text{-}hexane}$=7.24 (cal/cm$^3$)$^{1/2}$; $\delta_{DIW}$=23.43 (cal/cm$^3$)$^{1/2}$.

The solubility parameter SP can be set through the choice of monomers having an appropriate polarity when preparing the binders and/or by the subsequent modification of conventional binders with substances possessing appropriate polarity. It is essential in this context that the monomers used and/or substances serving for modification have a sufficiently low polarity. Thus, for example, polar monomers such as the OH-bearing compounds 4-hydroxybutyl acrylate and hydroxyethyl methacrylate, for example, are disadvantageous for use in acrylates, for example, since they lead to high SP values. Not quite so strongly pronounced is the effect of aromatic compounds, such as styrene.

For the subsequent modification of the binders as well it is essential to select appropriate substances having a low polarity. Thus, for example, conventional OH-functional binders, especially polyesters, can be esterified with monocarboxylic acids, especially noncyclic aliphatic monocarboxylic acids, in order to obtain low SP values.

It is essential in this context that the nonpolar monomers and/or substances for subsequent modification are not too long-chain, since this leads to poor results in the scratch resistance, chemical resistance, and hardness tests.

To achieve optimum results preferably on average at least one hydroxyl function of the polyester is esterified with at least one acid selected from the group consisting of isomeric $C_8$-$C_9$ monocarboxylic acids. In particular it is possible in this way to achieve a satisfactory residual gloss. The afore-described esterification with at least one $C_8$-$C_9$ carboxylic acid is also referred to, synonymously, as acid modification.

The polyester in clearcoat compositions of this kind preferably has a hydroxyl number of >180 mg KOH/g, more preferably 185-240 mg KOH/g as determined in accordance with DIN 53240, and a hydroxyl functionality (given by the number of free and esterified hydroxyl groups of the hydroxyl functional polyester) of greater than 16. Clearcoat compositions of this kind possess a sufficient microhardness (i.e., >90 N/mm$^2$, determined in accordance with DIN EN ISO 14577 using the Fischerscope instrument from Fischer, with a maximum force of 25.6 mN) and are scratch-resistant and chemical-resistant.

The radical of the isomeric $C_8$-$C_9$ monocarboxylic acid is preferably saturated. Clearcoat compositions of this kind exhibit good weathering stability.

Particularly advantageous properties in the sense of the invention result if the radical of the $C_8$-$C_9$ monocarboxylic acid is the radical of octanoic acid or isononanoic acid. A particularly preferred $C_8$-$C_9$ monocarboxylic acid used is isononanoic acid.

The polyester preferably has an acid number=6, preferably 0-5.5 as determined in accordance with DIN 53402. Acid numbers of this kind for the polyesters in the clearcoat formulations described lead to improved compatibility of these polyesters with other coating ingredients, and to improved leveling.

The polyester further preferably possesses a number-average molecular weight of 1500-4000 g/mol, preferably 2000-3500 g/mol as determined via GPC with a polystyrene standard in THF with 0.1 mol/l acetic acid. A low molecular weight of this kind in combination with a correspondingly narrow molecular weight distribution on the part of the dendritic polyester leads in general to improved compatibility.

Particular preference is given to using monodisperse or substantially monodisperse polyesters, which are simple, reliable, and reproducible to prepare and whose properties and terminal structures can be adapted easily and conveniently. Polyesters of this kind can be prepared by way of partial esterification of a hydroxyl functional polyester, which in turn is preparable via a process for the synthesis of a dendritic polymeric polyalcohol (polyesterpolyol) having reactive and optionally protected hydroxyl end groups in accordance with EP 991 690 81,
    the polymeric polyalcohol possessing n dendritic branches which spring from a monomeric or polymeric initiator molecule having n reactive groups (A), each branch comprising g branching generations, each generation comprising at least one polymeric or monomeric branching chain extender having three functional groups, of which at least two are reactive hydroxyl groups (B) and one is a carboxyl group (C) which is reactive with the reactive group (A) and/or the hydroxyl groups (B), and comprising, if desired, at least one spacer generation which comprises at least one spacer chain extender having two functional groups, of which one is a protected hydroxyl group (B") and one is a group (D) which is reactive with a hydroxyl group, n and g being integers and being at least 1, (i) the two hydroxyl groups (B) of the monomeric or polymeric chain branching extender used being acetal-protected hydroxyl groups (B'), the acetal protection being obtained through a reaction between the two hydroxyl groups (B) and an acetal-forming carbonyl compound; and (ii) a first branching generation being added to the initiator molecule by reaction between the reactive group (A) and the carboxyl group (C), in a molar ratio of the reactive groups (A) to the carboxyl groups (C) of at least 1, to give a polymeric polyalcohol having acetal-protected hydroxyl groups (B') and n dendritic branches which comprise one generation, the acetal-protected hydroxyl groups (B') being deprotected, if desired, by means of acetal cleavage, to give a polymeric polyalcohol having reactive hydroxyl groups (B); and (iii) further branching generations being added in g−1 repeated steps by reaction between reactive hydroxyl groups (B), which are obtained by deprotection by means of acetal cleavage, and carboxyl groups (C), in a molar ratio of hydroxyl groups (B) to carboxyl groups (C) of at least 1, to give a polymeric polyalcohol having acetal-protected hydroxyl groups (B') and n dendritic branches, which comprise two or more generations, the acetal-protected hydroxyl groups (B') being deprotected, if desired, by means of acetal cleavage, to give a polymeric polyalcohol having reactive hydroxyl groups (B), and optionally (iv) step (ii) and/or each repetition of step (iii) individually being followed by (a) a partial protection, such as, for example, protection as acetal, ketal and/or ester, of available reactive hydroxyl groups (B), to give a polymeric polyalcohol having at least one reactive hydroxyl group (B) for use in step (iii) or in a repeated step (ii), and/or by (b) the addition of the optional spacer chain extender, which after deprotection of the protected hydroxyl group (B") gives a polymeric polyalcohol having reactive hydroxyl groups (B) for use in step (iii) or a repeated step (iii) and n dendritic branches, which comprise one or more branching generations, and at least one spacer generation is at least one subgeneration.

The polyester fraction of the clearcoat composition is preferably 35% to 65%, more preferably 40% to 60% by weight based on the solids fraction of the clearcoat composition, and is guided by the respective OH number and by the curing agents employed. In this way it is possible to achieve optimum compatibility within the clearcoat compositions. The optimum amount for use may in this case deviate from the stoichiometric amount for use.

Optionally the clearcoat composition comprises as crosslinker(s) at least one di- or polyisocyanate and/or at least one amino resin and/or at least one tris(alkoxycarbonylamino)triazine. In this way, hardness and chemical resistance of the clearcoat films can be controlled according to requirements.

The crosslinker fraction of the clearcoat composition is preferably 30% to 60%, more preferably 40% to 60% by weight based on the solids fraction of the clearcoat composition. In this way the composition of the formulation can be optimized, particularly in respect of solids content and compatibility of the respective components.

Curing agents which can be used in the clearcoat compositions include, in particular, isocyanate curing agents and other crosslinkers, such as amino resin curing agents and trisalkoxycarbonylaminotriazines (TACT), for example, alone or in combination with one another. It is preferred to use aliphatic and/or cycloaliphatic isocyanates, alone or in combination with further crosslinking agents.

For the purpose of achieving lightfast and weather-resistant, universally useful coating materials, preference is given in particular to using hexamethylene diisocyanate (HDI) and isophoron diisocyanate (IPDI) curing agents in the clearcoat compositions. Preferably at least one HDI curing agent is used, with which coatings featuring crosslinking and resistance are obtained.

Polymeric isocyanurate curing agents are used with preference in the clearcoat compositions of the invention, on account of their comparatively low sensitization potential and on account of their good commercial availability. A particularly preferred curing agent used is an HDI isocyanurate, since corresponding coating compositions which comprise this curing agent exhibit low viscosity and hence have good processing properties and exhibit good leveling.

As a crosslinker the clearcoat composition preferably comprises at least one di- or polyisocyanate in order to achieve satisfactory performance in respect of resistance, especially acid resistance and weathering resistance.

The hardness and the surface properties of the resulting coating can be optimally controlled if the ratio of the NCO groups of the di- or polyisocyanate to the free OH groups of the hydroxyl functional polyester is =1.1:1, preferably 1.05:1 to 0.85:1. Moreover, suitable catalysts—already known in the prior art—for the respective forms of crosslinking can be used.

Particularly good coatings having particularly high scratch resistance and chemical resistance and particularly good optical properties result when the difference in the SP values of the binder and of the curing agent, as determined by the method outlined above, is not more than 1.0, preferably 0.8, with particular preference 0.5.

Also provided by the present invention is a hyperbranched, dendritic, hydroxyl functional polyester having an OH number=180 mg KOH/g as measured via DIN 53240. This polyester can be used as a highly functionalized binder in clearcoat compositions with high solids fraction, to give good surface optical qualities.

The polyester according to the invention preferably has a solubility parameter SP of =10.3, the solubility parameter being determined by way of the method described above.

Particularly good results are obtained if on average at least one hydroxyl function of the hyperbranched, dendritic, hydroxyl functional polyester is esterified with at least one acid selected from the group consisting of isomeric $C_a$—$C_e$ monocarboxylic acids. The result, for example, is good residual gloss in corresponding clearcoat compositions.

The polyester preferably has a hydroxyl number of >180 mg KOH/g, more preferably 185-240 mg KOH/g as determined in accordance with DIN 53240, and a hydroxyl functionality (given by the number of free and acid-modified hydroxyl groups of the hydroxyl functional polyester) of greater than 16. Clearcoat films which comprise these polyesters possess good microhardness, scratch resistance, and chemical resistance.

The radical of the $C_8$-$C_9$ monocarboxylic acid is preferably saturated. Polyesters of this kind in clearcoat compositions lead to films having good weathering stability.

With particular advantage the radical of the $C_8$-$C_9$ monocarboxylic acid is the radical of octanoic acid or isononanoic acid. With particular preference the radical of the $C_8$-$C_9$ monocarboxylic acid is an isononanoic acid radical.

The polyester preferably has an acid number=6, more preferably 0-5.5 as determined in accordance with DIN 53402. Polyesters with such acid numbers are highly compatible with other ingredients in coating compositions, and lead to good leveling.

The polyester, furthermore, preferably possesses a number-average molecular weight of 1500-4000 g/mol, more preferably 2000-3500 g/mol as determined via GPC with a polystyrene standard in THF with 0.1 mol/l acetic acid. Such molecular weights lead in coating compositions to improved compatibility in comparison to high molecular mass substances.

The present invention further provides a process for preparing a hyperbranched, dendritic polyester of the invention, which comprises first of all preparing a dendritic polymeric polyalcohol (polyesterpolyol) having reactive and optionally protected hydroxyl end groups, the polymeric polyalcohol possessing n dendritic branches which spring from a monomeric or polymeric initiator molecule having n reactive groups (A), each branch comprising g branching generations, each generation comprising at least one polymeric or monomeric branching chain extender having three functional groups, of which at least two are reactive hydroxyl groups (B) and one is a carboxyl group (C) which is reactive with the reactive group (A) and/or the hydroxyl groups (B), and comprising, if desired, at least one spacer generation which comprises at least one spacer chain extender having two functional groups, of which one is a protected hydroxyl group (B") and one is a group (D) which is reactive with a hydroxyl group, n and g being integers and being at least 1, (i) the two hydroxyl groups (B) of the monomeric or polymeric chain branching extender used being acetal-protected hydroxyl groups (B'), the acetal protection being obtained through a reaction between the two hydroxyl groups (B) and an acetal-forming carbonyl compound;

and (ii) a first branching generation being added to the initiator molecule by reaction between the reactive group (A) and the carboxyl group (C), in a molar ratio of the reactive groups (A) to the carboxyl groups (C) of at least 1, to give a polymeric polyalcohol having acetal-protected hydroxyl groups (B') and n dendritic branches which comprise one generation, the acetal-protected hydroxyl groups (B') being deprotected, if desired, by means of acetal cleavage, to give a polymeric polyalcohol having reactive hydroxyl groups (B); and (iii) further branching generations being added in g−1 repeated steps by reaction between reactive hydroxyl groups (B), which are obtained by deprotection by means of acetal cleavage, and carboxyl groups (C), in a molar ratio of hydroxyl groups (B) to carboxyl groups (C) of at least 1, to give a polymeric polyalcohol having acetal-protected hydroxyl groups (B') and n dendritic branches, which comprise two or more generations, the acetal-protected hydroxyl groups (B') being deprotected, if desired, by means of acetal cleavage, to give a polymeric polyalcohol having reactive hydroxyl groups (B), and optionally (iv) step (ii) and/or each repetition of step (iii) individually being followed by (a) a partial protection, such as, for example, protection as acetal, ketal and/or ester, of available reactive hydroxyl groups (B), to give a polymeric polyalcohol having at least one reactive hydroxyl group (B) for use in step (iii) or in a repeated step (ii), and/or by (b) the addition of the optional spacer chain extender, which after deprotection of the protected hydroxyl group (B") gives a polymeric polyalcohol having reactive hydroxyl groups (B) for use in step (iii) or a repeated step (iii) and n dendritic branches, which comprise one or more branching generations, and at least one spacer generation is at least one subgeneration;

followed by a partial esterification of the hydroxyl functional polyester with an isomeric C8-C9 monocarboxylic acid. The compounds prepared by this simple, reliable, and reproducible process may be monodisperse or substantially monodisperse. Moreover, the properties and terminal structures of the compounds can be adapted easily and conveniently.

The present invention further provides a process for preparing the polyester of the invention by partially esterifying a hyperbranched, dendritic, hydroxyl functional polyester with at least one isomeric $C_8$-$C_9$ monocarboxylic acid.

The invention further provides for the use of the clearcoat compositions of the invention for producing clearcoating compositions for automotive OEM finishing, the finishing of body-mounted components or commercial vehicles, or refinishing. The clearcoat compositions are preferably suitable for use in the wet-on-wet method. In this method an optionally pretreated substrate optionally coated preliminarily with a cathodic electrocoat primer and a surfacer is coated in two steps first with the basecoat material and then with the clearcoat material. "Wet-on-wet" here means that both coating materials are applied soon after one another without baking of the basecoat material, before then being jointly baked and crosslinked. With particular preference the clearcoat material of the invention is used in a finishing process in which a substrate coated with a baked cathodic electrocoat is coated with a modified basecoat material, after intermediate flash-off a basecoat material is applied, after a further flash-off a clearcoat material is applied, and after an optional flash-off the coating components are jointly baked. In this process no conventional surfacer is used.

The invention further provides substrates coated with a clearcoat composition of the invention. Substrates of this kind are optionally pretreated substrates which optionally have been coated preliminarily with a cathodic electrocoat primer and a surfacer and are composed of steel, galvanized steel or aluminum, of the kind employed in the manufacture of automobile bodies.

EXAMPLES

Comparative Example 1

Preparation of the Polyester SP1

A reactor provided with a stirrer, reflux condenser, and water separator is charged with 1696 parts by weight of hexanoic acid, and 40 parts by weight of xylene are added. The mixture is carefully heated to 80° C. with stifling. Then 4439 parts by weight of a dendritic hydroxyl functional polyester (Boltorn H 30, available from Perstorp) are added slowly in order to avoid lumps forming. Following the addition, the reaction mixture is heated to 200° C. To monitor the course of the reaction, the volume of the condensate is recorded, and from time to time a sample is taken for determination of the hydroxyl number. When the amount of condensate calculated beforehand as corresponding to complete conversion has been reached, the xylene fraction is removed by distillation. The reaction mixture is stirred at 200° C. until an acid number of less than 5 mg KOH/g (determined in accordance with DIN 53402) is reached. The mixture is cooled to 145° C. and dissolved in 994 parts by weight of pentyl acetate.

The resulting polyester resin has a solids fraction of 84.1% by weight and a viscosity of 15.1 dPas (determined in accordance with DIN EN ISO 2884-1). The resulting hydroxyl number of 220 mg KOH/g (determined in accordance with DIN 53240).

Comparative Example 2

Preparation of the Polyester SP2

Example 1 is repeated for the following reactants in the stated amounts:

| Boltorn H 30 | 4439 parts by weight |
| Heptanoic acid | 1628 parts by weight |
| Xylene | 40 parts by weight |
| Pentyl acetate | 994 parts by weight |

The resulting polyester resin has a solids fraction of 84.1% by weight and a viscosity of 11.5 dPas (determined in accordance with DIN EN ISO 2884-1). The resulting hydroxyl number of 220 mg KOH/g (determined in accordance with DIN 53240).

Inventive Example 3

Preparation of the Polyester SP3

Example 1 is repeated for the following reactants in the stated amounts:

| Boltorn H 30 | 4439 parts by weight |
| Octanoic acid | 1574 parts by weight |
| Xylene | 40 parts by weight |
| Pentyl acetate | 994 parts by weight |

The resulting polyester resin has a solids fraction of 85.8% by weight and a viscosity of 11.5 dPas (determined in accordance with DIN EN ISO 2884-1). The resulting hydroxyl number of 220 mg KOH/g (determined in accordance with DIN 53240).

Inventive Example 4

Preparation of the Polyester SP4

Example 1 is repeated for the following reactants in the stated amounts:

| Boltorn H 30 | 4439 parts by weight |
| Isononanoic acid | 1523 parts by weight |
| Xylene | 40 parts by weight |
| Pentyl acetate | 994 parts by weight |

The resulting polyester resin has a solids fraction of 86.3% by weight and a viscosity of 15.1 dPas (determined in accordance with DIN EN ISO 2884-1). The resulting hydroxyl number of 220 mg KOH/g (determined in accordance with DIN 53240).

Comparative Example 5

Preparation of the Polyester SP5

Example 1 is repeated for the following reactants in the stated amounts:

| Boltorn H 30 | 4439 parts by weight |
| Decanoic acid | 1480 parts by weight |
| Xylene | 40 parts by weight |
| Pentyl acetate | 994 parts by weight |

The resulting polyester resin has a solids fraction of 85.5% by weight and a viscosity of 11.5 dPas (determined in accordance with DIN EN ISO 2884-1). The resulting hydroxyl number of 220 mg KOH/g (determined in accordance with DIN 53240).

Inventive Example 6

Preparation of the Polyester SP6

The preparation process outlined in example 1 is employed, using Boltorn H 20 (available from Perstorp), isononanoic acid, xylene, and pentyl acetate, to produce a polyester resin having a solids fraction of 85.0% by weight, a viscosity of 5.65 dPas (determined in accordance with DIN EN ISO 2884-1), and a hydroxyl number of 220 mg KOH/g (determined in accordance with DIN 53240).

Inventive Example 7

Preparation of the Polyester SP7

The preparation process outlined in example 1 is employed, using Boltorn H 30, isononanoic acid, xylene, and pentyl acetate, to produce a polyester resin having a solids fraction of 85.0% by weight, a viscosity of 15.5 dPas (determined in accordance with DIN EN ISO 2884-1), and a hydroxyl number of 240 mg KOH/g (determined in accordance with DIN 53240).

Inventive Example 8

Preparation of the Polyester SP8

The preparation process outlined in example 1 is employed, using Boltorn H 30, isononanoic acid, xylene, and pentyl acetate, to produce a polyester resin having a solids fraction of 82.0% by weight, a viscosity of 5.1 dPas (determined in accordance with DIN EN ISO 2884-1), and a hydroxyl number of 180 mg KOH/g (determined in accordance with DIN 53240).

TABLE 1

Overview of the polyester resins of examples 1 to 8

| Resin | Polyester type | Modifier | SP | Hydroxyl number |
|---|---|---|---|---|
| SP1 | Boltorn H 30[1] | Hexanoic acid | 10.29 | 220 |
| SP2 | Boltorn H 30 | Heptanoic acid | 10.01 | 220 |
| SP3 | Boltorn H 30 | Octanoic acid | 9.88 | 220 |
| SP4 | Boltorn H 30 | Isononanoic acid | 9.88 | 220 |
| SP5 | Boltorn H 30 | Decanoic acid | 9.63 | 220 |
| SP6 | Boltorn H 20[2] | Isononanoic acid | 9.90 | 220 |
| SP7 | Boltorn H 30 | Isononanoic acid | 10.16 | 240 |
| SP8 | Boltorn H 30 | Isononanoic acid | 9.5 | 180 |

[1]Boltorn H 30: OH functionality 32
[2]Boltorn H 20: OH functionality 16

Preparation of an Inventive SCA Resin

A 10 liter Juvo laboratory reaction vessel with heating jacket, equipped with thermometer, stirrer, and top-mounted condenser, is charged with 1512.5 g of solvent naphtha. With stirring and blanketing with 200 cm$^3$/min nitrogen the solvent naphtha charged is heated to 160° C. under superatmospheric pressure (max. 3.5 bar) and, by means of a metering pump, a mixture of 80.5 g of di-tert-butyl peroxide and 201.0 g of solvent naphtha is added dropwise at a uniform rate over the course of 4.75 h. 0.25 h after the beginning of the feed, a metering pump is used to meter in a mixture of 1283.5 g of styrene, 1115.0 g of n-butyl acrylate, 693.5 g of hydroxyethyl acrylate, 70.5 g of methacrylic acid and 43.5 g of Methacrylic ester-13 at a uniform rate over the course of 4 h. After the end of the feed the temperature is maintained for 2 h and then the product is cooled to 60° C. and filtered through a 5 μm-GAF bag. The resulting resin has an acid number of 15 mg KOH/g (DIN 53402), a solids content of 65%±1 (60 min, 130° C.) and a viscosity of 5.0 dPa*s as measured in accordance with DIN ISO 2884-1 (55% in solvent naphtha).

Urea Precipitation:

A 200 l vessel is charged with 84.7 g of the resin solution and this initial charge is diluted with 5.88 g of butyl acetate. Then 2.24 g of benzylamine are added and the mixture is stirred for 30 minutes. After this time, with a high level of shearing, a mixture of 1.76 g of hexamethylene diisocyanate and 3.42 g of butyl acetate is added at a rate such that the reaction temperature of 40° C. is not exceeded. The mixture obtained has a viscosity of >800 mPas (10 s$^{-1}$) (Z3) (DIN ISO 2884-1) and a solids content of 58.6-59.6% (60 min, 130° C.).

Preparation of an Inventive Thixotroping Paste

A 10 liter Juvo laboratory reaction vessel with heating jacket, equipped with thermometer, stirrer, and top-mounted condenser, is charged with 3166.1 g of Shellsol A. With stirring and blanketing with 200 cm$^3$/min nitrogen the Shellsol A charged is heated to 156° C. and, by means of a dropping funnel, a mixture of 155.9 g of di-tert-butyl peroxide and 297.4 g of Shellsol A is added dropwise at a uniform rate over the course of 4.75 h. 0.25 h after the beginning of the feed, a dropping funnel is used to meter in a mixture of 829.5 g of styrene, 2041.8 g of n-butyl acrylate, 893.3 g of n-butyl methacrylate, 1276.1 g of hydroxyethyl acrylate, 63.8 g of acrylic acid and 1276.1 g of 4-hydroxybutyl acrylate at a uniform rate over the course of 4 h. After the end of the feed the temperature is maintained for 2 h and then the product is cooled to 80° C. and filtered through a 5 μm-GAF bag. The resulting resin has an acid number of 10 mg KOH/g (DIN 53402), a solids content of 65%±1 (60 min, 130° C.) and a viscosity of 20.0 dPa*s as measured in accordance with DIN ISO 2884-1.

A 200 l vessel is charged with 43.8 g of the resin solution and this initial charge is diluted with 24.7 g of xylene and 23.4 g of butanol. After 10 minutes, 11.1 g of Aerosil R812 are added with shearing and the mixture was subjected to shearing for a further 30 minutes. The mixture obtained has a viscosity of 130 mPas (10 s$^{-1}$) (Z3) (DIN ISO 2884-1).

Clearcoat Compositions

The polyester resins specified in table 1 were used in the following weighed amounts to prepare the first component of a 2-component clearcoat material:

| | 1 | 2 | 3 | 4 | 5 | 6 | 7 |
|---|---|---|---|---|---|---|---|
| SP1 | 91.94 | | | | | | |
| SP2 | | 92.23 | | | | | |
| SP4 | | | 92.26 | | | | |
| SP5 | | | | 96.55 | | | |
| SP6 | | | | | 92.91 | | |
| SP7 | | | | | | 90.88 | |
| SP8 | | | | | | | 95.79 |
| Butanol | 2.39 | 2.39 | 2.39 | 2.39 | 2.39 | 2.39 | 2.39 |
| GB Ester[3] | 7.38 | 7.38 | 7.38 | 7.38 | 7.38 | 7.38 | 7.38 |
| MPA[4] | 12.41 | 12.41 | 12.41 | 12.41 | 12.41 | 12.41 | 12.41 |
| Pentyl acetate | 14.90 | 14.90 | 14.90 | 14.90 | 14.90 | 14.90 | 14.90 |
| BDGA[5] | 7.67 | 7.67 | 7.67 | 7.67 | 7.67 | 7.67 | 7.67 |
| Ethoxypropyl acetate | 3.76 | 3.76 | 3.76 | 3.76 | 3.76 | 3.76 | 3.76 |
| Xylene | 2.10 | 2.10 | 2.10 | 2.10 | 2.10 | 2.10 | 2.10 |
| Byk 331[6] | 0.14 | 0.14 | 0.14 | 0.14 | 0.14 | 0.14 | 0.14 |
| Byk ES-80[7] | 0.29 | 0.29 | 0.29 | 0.29 | 0.29 | 0.29 | 0.29 |
| Tinuvin 292[8] | 1.45 | 1.45 | 1.45 | 1.45 | 1.45 | 1.45 | 1.45 |
| Tinuvin 384-2[9] | 1.74 | 1.74 | 1.74 | 1.74 | 1.74 | 1.74 | 1.74 |

[3]Glycolic acid n-butyl ester (GB Ester), available under the trade name Polysolvan O from Celanese Chemicals Europe GmbH, 61476 Kronberg
[4]MPA = Methoxypropyl acetate
[5]BDGA = Butyldiglycol acetate
[6]Polyether-modified polydimethylsiloxane, Byk-Chemie GmbH, Wesel
[7]Additive, Byk-Chemie GmbH, Wesel
[8]Stabilizer based on sterically hindered amines, Ciba Specialty Chemicals, Basle, Switzerland
[9]UV absorber, Ciba Specialty Chemicals, Basle, Switzerland To prepare two-component clearcoat coatings, the first components prepared as detailed above are homogenized with the weighed amounts, given below, of the second component (polyisocyanate curing agent Basonat HI 190 from BASF Aktiengesellschaft) and the homogenized mixtures were applied directly after that.

Component 2:

| | | | | | | | |
|---|---|---|---|---|---|---|---|
| Basonat HI 190[10] | 65.02 | 72.95 | 72.95 | 72.95 | 72.95 | 72.95 | 76.39 |

[10]190% strength solution in a 1:1 mixture of n-butyl acetate and Solvesso® 100

This was done using metal test panels which had each been coated with a customary and known, cathodically deposited, thermally cured electrocoat, a customary and known, thermally cured surfacer coat, and a film, subjected to preliminary drying at 80° C. for 10 minutes, of a commercially customary, conventional black basecoat material from BASF Coatings AG. The basecoat film and the clearcoat film were cured jointly at 140° C. for 22 minutes. The resulting basecoat had a coat thickness of 7.5 μm, the resulting clearcoat a coat thickness of approximately 35 μm.

The properties of the resulting clearcoat coatings are as follows:

|   | 1 | 2 | 3 | 4 | 5 | 6 | 7 |
|---|---|---|---|---|---|---|---|
| Solids fraction of the mixture [% by weight] | 65.4 | 65.1 | 65.4 | 65.9 | 65.8 | 65.9 | 66.2 |
| Microhardness [N/mm$^2$][11] | <40 (soft) | <40 (soft) | 97 | 49 | 55 | 123 | 47 |
| Surface optical qualities (Appearance)[12] | 0 | 0 | 2 | 1 | 2 | 2 | 2 |
| Residual AMTEC gloss after cleaning[%] | ./. | ./. | 87 | ./. | 92 | 79 | 92 |

[11]Determined in accordance with DIN EN ISO 14577 using the Fischerscope instrument from Fischer, with a maximum force of 25.6 mN
[12]Determined by inspection of the cured films: 0 = uneven surface, poor surface optical qualities; 1 = extremely matt surface, poor surface optical qualities; 2 = smooth surface, very good surface optical qualities The experiment results show that a minimum and maximum length of hydrocarbon radical in the monocarboxylic acid modifier is necessary in order to ensure compatibility with the curing agent and with the substrate. Short chains lead to incompatibility (examples 1-2), as do long chains (example 4).

In order to ensure that the resulting films continue to have satisfactory hardness it is sensible to select resins having a sufficiently high hydroxyl number (examples 6 and 7).

The functionality of the polyester employed (as the sum of the free and esterified hydroxyl groups of the polyester employed) also has a substantial influence on the properties of the resulting film: polyesters with low hydroxyl functionality (example 5, Boltorn 20, functionality=16) lead to soft films, whereas high functionalities (example 3, functionality=32) lead to substantially harder films.

With the aid of the hyperbranched, dendritic polyesters it is possible to achieve substantially higher solids fractions in 2-component clearcoat compositions than in conventional compositions.

Comparative Example 8

Two-Component Clearcoat Composition of the Prior Art

| Macrynal SM 510 N[13] | 52.3 |
|---|---|
| DBTL (5% in xylene)[14] | 0.1 |
| Tinuvin 292[15] | 0.24 |
| Tinuvin 900 (18% in xylene)[16] | 1.33 |
| BA[17] | 12.8 |
| Xylene | 11.6 |
| Dibasic Ester[18] | 5.0 |
| Fluorad FC 430[19] | 0.2 |
| Total: | 83.6 |
| Crosslinker: Desmodur N 3300[20] | 16.4 |

[13]Hydroxyl-functional acrylate copolymer, available from Solutia Germany GmbH, 55252 Mainz - Kastel
[14]DBTL = Dibutyltin dilaurate
[15]Stabilizer based on sterically hindered amines, Ciba Specialty Chemicals, Basle, Switzerland
[16]UV absorber, Ciba Specialty Chemicals, Basle, Switzerland
[17]Butyl acetate
[18]Mixture of different esters, available under the trade name DBE from Lemro, 41515 Grevenbroich
[19]Fluoroaliphatic ester, in partial solution in toluene, available from 3 M Deutschland GmbH, 41453 Neuss.
[20]Aliphatic polyisocyanate, Bayer Material Sciences, Leverkusen In comparison to the prior-art clearcoat compositions (solids fraction 50% by weight) the clearcoat compositions of the invention have a substantially higher solids fraction.

Inventive Example 9

Two-Component Clearcoat Composition

| Polyester resin SP4 | 94.48 |
|---|---|
| Butanol | 2.44 |
| GB Ester[21] | 7.55 |
| MPA[22] | 12.71 |
| Pentyl acetate | 15.26 |
| BDGA[23] | 7.85 |
| Ethoxypropyl acetate | 3.85 |
| Xylene | 2.15 |
| Byk 300[24] | 0.07 |
| Byk ES-80[25] | 0.3 |
| Tinuvin 152 (50% in BA)[26] | 1.48 |
| Tinuvin 384-2[27] | 1.78 |
| Crosslinker: Basonat HI 190[28] | 74.71 |

[21]Glycolic acid n-butyl ester (GB Ester), available under the trade name Polysolvan O from Celanese Chemicals Europe GmbH, 61476 Kronberg
[22]Methoxypropyl acetate
[23]Butyldiglycol acetate
[24]Solution of a polyether-modified polydimethylsiloxane, Byk-Chemie GmbH, Wesel
[25]Additive, Byk-Chemie GmbH, Wesel
[26]Stabilizer based on sterically hindered amines, Ciba Specialty Chemicals, Basle, Switzerland
[27]UV absorber, Ciba Specialty Chemicals, Basle, Switzerland
[28]Polyisocyanate curing agent from BASF Aktiengesellschaft The two-component clearcoat composition is applied to metal test panels. The metal test panels used have each been coated with a customary and known, cathodically deposited, thermally cured electrocoat, a customary and known, thermally cured surfacer coat, and a film, subjected to preliminary drying at 80° C. for 10 minutes, of a commercially customary, conventional black basecoat material from BASF Coatings AG. The basecoat film and the clearcoat film are cured jointly at 140° C. for 22 minutes. The resulting basecoat has a film thickness of 7.5 μm, the resulting clearcoat of film thickness of approximately 35 μm.

The resulting clearcoat films have very good compatibility—in spite of the high solids fraction—and are notable for very good surface optical qualities. The residual AMTEC gloss of the coatings is 83% and the microhardness is 111 N/mm$^2$.

Inventive Example 10

Two-Component Clearcoat Composition

| Polyester resin SP3 | 37.4 |
|---|---|
| SCA resin | 5.5 |
| Setalux 91756 VS - 60[29] | 8.4 |
| Thixotroping paste | 1.3 |
| Cycat 4045[30] | 0.3 |
| BGA[31] | 6.1 |
| Setamine US - 138[32] | 5.8 |
| Disperbyk 161[33] | 0.7 |
| Byk 325 | 0.1 |
| Butyl acetate | 4.5 |
| Tinuvin 5248[34] | 2.1 |
| Solvesso 200[35] | 1.0 |
| Byk 390[36] | 0.1 |
| Solvent naphtha | 7.4 |
| Butanol | 3.5 |

| | |
|---|---|
| Xylene | 5.0 |
| Crosslinker: Basonat HI 190 | 33.0 |

[29]SCA resin, in partial soluton in Solvesso 100/butyl acetate, available from Nuplex Resins, 4600 Bergen op Zoom, Netherlands.
[30]Catalyst containing sulfonic acid, available from Cytec
[31]Butylglycol acetate
[32]Melamine resin, in partial solution in butanol, available from Nuplex Resins, 4600 Bergen op Zoom, Netherlands.
[33]A high molecular mass wetting assistant, available from Byk Chemie, Wesel
[34]Partial solution of a mixture of light stabilizer additives, available from Ciba Spezialitätenchemie, Basle.
[35]Solvent mixture, available from Exxon Mobil Petroleum & Chemical, B 1831 Machelen, Belgium.
[36]Antipopping additive, available from Byk Chemie, Wesel The two-component clearcoat composition is applied to metal test panels. The metal test panels used have each been coated with a customary and known, cathodically deposited, thermally cured electrocoat, a customary and known, thermally cured surfacer coat, and a film, subjected to preliminary drying at 80° C. for 10 minutes, of a commercially customary, conventional black basecoat material from BASF Coatings AG. The basecoat film and the clearcoat film are cured jointly at 140° C. for 22 minutes. The resulting basecoat has a film thickness of 7.5 μm, the resulting clearcoat a film thickness of approximately 35 μm.

The resulting clearcoat films have very good compatibility—in spite of the high solids fraction—and are notable for very good surface optical qualities. The residual AMTEC gloss of the coatings is 85% and the microhardness is 97 N/mm$^2$.

What is claimed is:

1. A thermoset clearcoat composition comprising:
   a binder resin that is a hyperbranched, dendritic, hydroxyl-functional polyester comprising an OH number greater than or equal to 180 mg KOH/gas measured via DIN 53240, wherein the hyperbranched, dendritic, hydroxyl-functional polyester comprises on average at least one hydroxyl function of the polyester esterified with at least one acid selected from the group consisting of saturated isomeric $C_8$-$C_9$ monocarboxylic acids, wherein the clearcoat composition comprises a polyester fraction of from 35% to 65% by weight, based on the solids fraction of the clearcoat composition; and
   a crosslinking agent selected from the group consisting of diisocyanates, polyisocyanates and mixtures thereof, wherein the clearcoat composition comprises a crosslinker fraction of from 30% to 60% by weight, based on the solids fraction of the clearcoat composition;
   wherein the polyester comprises a solubility parameter SP of less than or equal to 10.3 and a hydroxyl functionality of greater than 16 given by the number of free and esterified hydroxyl groups of the hydroxyl-functional polyester.

2. The clearcoat composition of claim 1, wherein the at least one acid selected from the group consisting of saturated isomeric $C_8$-$C_9$ monocarboxylic acids is a saturated isomeric $C_9$ monocarboxylic acid.

3. The clearcoat composition of claim 2, wherein the at least one acid saturated isomeric $C_9$ monocarboxylic acid is isononaoic acid.

4. The clearcoat composition of claim 1, wherein the polyester has an acid number of no more than 6, as determined in accordance with DIN 53402.

5. The clearcoat composition of claim 1, wherein the polyester has a number-average molecular weight of 1500-4000 g/mol, as determined via GPC with a polystyrene standard in THF with 0.1% by weight of acetic acid.

6. The clearcoat composition of claim 1, wherein the polyester is prepared via a partial esterification of a hydroxyl-functional polyester which in turn is prepared via a process for the synthesis of a dendritic polymeric polyfunctional polyalcohol (polyesterpolyol) having reactive hydroxyl end groups,
   the polymeric polyalcohol possessing n dendritic branches which spring from a monomeric or polymeric initiator molecule having n reactive groups (A), each branch comprising g branching generations, each generation comprising at least one polymeric or monomeric branching chain extender having three functional groups, of which at least two are reactive hydroxyl groups (B) and one is a carboxyl group (C) which is reactive with the reactive group (A) and/or the hydroxyl groups (B), and optionally comprising at least one spacer generation which comprises at least one spacer chain extender having two functional groups, of which one is a protected hydroxyl group (B") and one is a group (D) which is reactive with a hydroxyl group, n and g being integers and being at least 1,
   (i) the two hydroxyl groups (B) of the monomeric or polymeric chain branching extender used being acetal-protected hydroxyl groups (B'), the acetal protection being obtained through a reaction between the two hydroxyl groups (B) and an acetal-forming carbonyl compound; and
   (ii) a first branching generation being added to the initiator molecule by reaction between the reactive group (A) and the carboxyl group (C), in a molar ratio of the reactive groups (A) to the carboxyl groups (C) of at least 1, to give a polymeric polyalcohol having acetal-protected hydroxyl groups (B') and n dendritic branches which comprise one generation, the acetal-protected hydroxyl groups (B') being deprotected, optionally, by means of acetal cleavage, to give a polymeric polyalcohol having reactive hydroxyl groups (B); and
   (iii) further branching generations being added in g-1 repeated steps by reaction between reactive hydroxyl groups (B), which are obtained by deprotection by means of acetal cleavage, and carboxyl groups (C), in a molar ratio of hydroxyl groups (B) to carboxyl groups (C) of at least 1, to give a polymeric polyalcohol having acetal-protected hydroxyl groups (B') and n dendritic branches, which comprise two or more generations, the acetal-protected hydroxyl groups (B') being deprotected, optionally, by means of acetal cleavage, to give a polymeric polyalcohol having reactive hydroxyl groups (B), and
   optionally (iv) step (ii) and/or each repetition of step (iii) individually being followed by
   (a) a partial protection of available reactive hydroxyl groups (B), to give a polymeric polyalcohol having at least one reactive hydroxyl group (B) for use in step (iii) or in a repeated step (ii), and/or by
   (b) the addition of the optional spacer chain extender, which after deprotection of the protected hydroxyl group (B") gives a polymeric polyalcohol having reactive hydroxyl groups (B) for use in step (iii) or a repeated step (iii) and n dendritic branches, which comprise one or more branching generations, and at least one spacer generation is at least one subgeneration.

7. The clearcoat composition of claim 6, wherein the partial protection of available reactive hydroxyl groups (B) comprises an acetal, ketal, and/or ester group.

8. The clearcoat composition of claim 1, wherein the ratio of NCO groups to free OH groups is from 1.1:1 to 0.85:1.

9. The clearcoat composition of claim 1, wherein the hyperbranched, dendritic, hydroxyl-functional polyester binder resin has a number average molecular weight or 1500-4000 g/mol as determine via GPC with a polystyrene standard in THF with 0.1 mol/l acetic acid.

10. The clearcoat composition of claim 1, wherein the hyperbranched, dendritic, hydroxyl-functional polyester binder resin has a number average molecular weight or 2000-3500 g/mol as determine via GPC with a polystyrene standard in THF with 0.1 mol/l acetic acid.

11. A method of coating an OEM automotive substrate, comprising applying the clearcoat composition of claim 1 to an automotive substrate.

12. The method of claim 11, wherein the clearcoat material is applied in a wet-on-wet finishing process.

13. A substrate coated with a clearcoat composition as claimed in claim 1.

* * * * *